United States Patent
Liu et al.

(10) Patent No.: US 7,633,707 B2
(45) Date of Patent: Dec. 15, 2009

(54) PASSIVE TEST CIRCUIT USED TO DETERMINE A BACK EMF OF A VOICE COIL MOTOR DURING APPLICATION OF A BIAS VOLTAGE

(75) Inventors: Yanning Liu, San Ramon, CA (US); Seong Woo Kang, San Jose, CA (US); Seungman Chang, Redwood City, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 87 days.

(21) Appl. No.: 12/012,858

(22) Filed: Feb. 5, 2008

(65) Prior Publication Data
US 2009/0195901 A1 Aug. 6, 2009

(51) Int. Cl.
*G11B 5/596* (2006.01)
(52) U.S. Cl. .................................................. 360/78.04
(58) Field of Classification Search ........................ None
See application file for complete search history.

(56) References Cited

U.S. PATENT DOCUMENTS

| | | | | |
|---|---|---|---|---|
| 4,885,517 | A * | 12/1989 | Pennock | 318/678 |
| 5,838,515 | A * | 11/1998 | Mortazavi et al. | 360/78.12 |
| 6,479,954 | B1 * | 11/2002 | Peritore et al. | 318/687 |
| 6,804,131 | B2 * | 10/2004 | Galbiati et al. | 363/132 |
| 6,826,007 | B1 * | 11/2004 | Patton, III | 360/78.06 |
| 6,975,479 | B2 * | 12/2005 | Kokami et al. | 360/77.02 |

* cited by examiner

*Primary Examiner*—K. Wong
(74) *Attorney, Agent, or Firm*—Ben J. Yorks; Irell & Manella LLP

(57) ABSTRACT

A hard disk drive with a voice coil motor coupled to a head. The head moves relative to a disk. The voice coil motor receives a biasing voltage and has a back emf voltage. A test circuit is coupled to the voice coil motor to determine the back emf voltage. The back emf voltage can be used to analyze low frequency vibration in the disk drive. The test circuit can be constructed so that the back emf voltage is proportional to a pair of test resistors and/or a pair of test inductors. The biasing voltage allows the back emf voltage to be measured and analyzed while the head is at any location from the ID to the OD of the disk.

11 Claims, 3 Drawing Sheets

PASSIVE TEST CIRCUIT USED TO DETERMINE A BACK EMF OF A VOICE COIL MOTOR DURING APPLICATION OF A BIAS VOLTAGE

BACKGROUND OF THE INVENTION

1. Field of the Invention

The present invention relates to determining a back emf voltage of a hard disk drive voice coil motor.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

Disk drives typically employ a servo to maintain the heads on the centers of the tracks. Deviations from the track center line may create errors in the reading and/or writing of data. The servo utilizes servo bits written into servo fields of the disk. The servo bits are used to produce a position error signal ("PES") that is processed to center the head on the disk track.

The drive may be subjected to vibration. For example, disk drives have a spindle motor that rotates the disks relative to the heads. Rotation of the spindle motor may create a vibration that is transmitted through the drive. Servo routines are typically constructed to compensate for vibration through detection and/or prediction algorithms. It is generally desirable to study vibration of a disk drive to create effective servo routines. One way of studying vibration is to analyze the read signal and/or PES of the disk drive. For various reasons it is also desirable to study vibration without servo, in an open loop system.

One way to detect and analyze vibration is by measuring and analyzing the back emf voltage of the voice coil motor. Voice coil motors are typically biased to a middle location ("MD") of the disk. The head can be placed at the MD position and the back emf voltage can be measured and analyzed. It is desirable to study vibration while the heads are at any location across the stroke from disk inner diameter ("ID") and outer diameter ("OD)". This requires some type of force to maintain the heads at the specific location to balance with the bias forces due to air flow, FPC and pivot friction. For analysis of high frequency vibration the voice coil motor may be biased with a piece of tape. When analyzing low frequency vibration it has been found that the tape distorts the back emf values.

BRIEF SUMMARY OF THE INVENTION

A hard disk drive with a voice coil motor coupled to a head. The voice coil motor receives a biasing voltage and has a back emf voltage. A test circuit is coupled to the voice coil motor to determine the back emf voltage.

DETAILED DESCRIPTION

Described is a hard disk drive with a voice coil motor coupled to a head. The head moves relative to a disk. The voice coil motor receives a biasing voltage and has a back emf voltage. A test circuit is coupled to the voice coil motor to determine the back emf voltage. The back emf voltage can be used to analyze low frequency vibration in the disk drive. The test circuit can be constructed so that the back emf voltage is proportional to a pair of test resistors and/or a pair of test inductors. The biasing voltage allows the back emf voltage to be measured and analyzed while the head is at any location from ID to OD on the disk.

Figure 1:
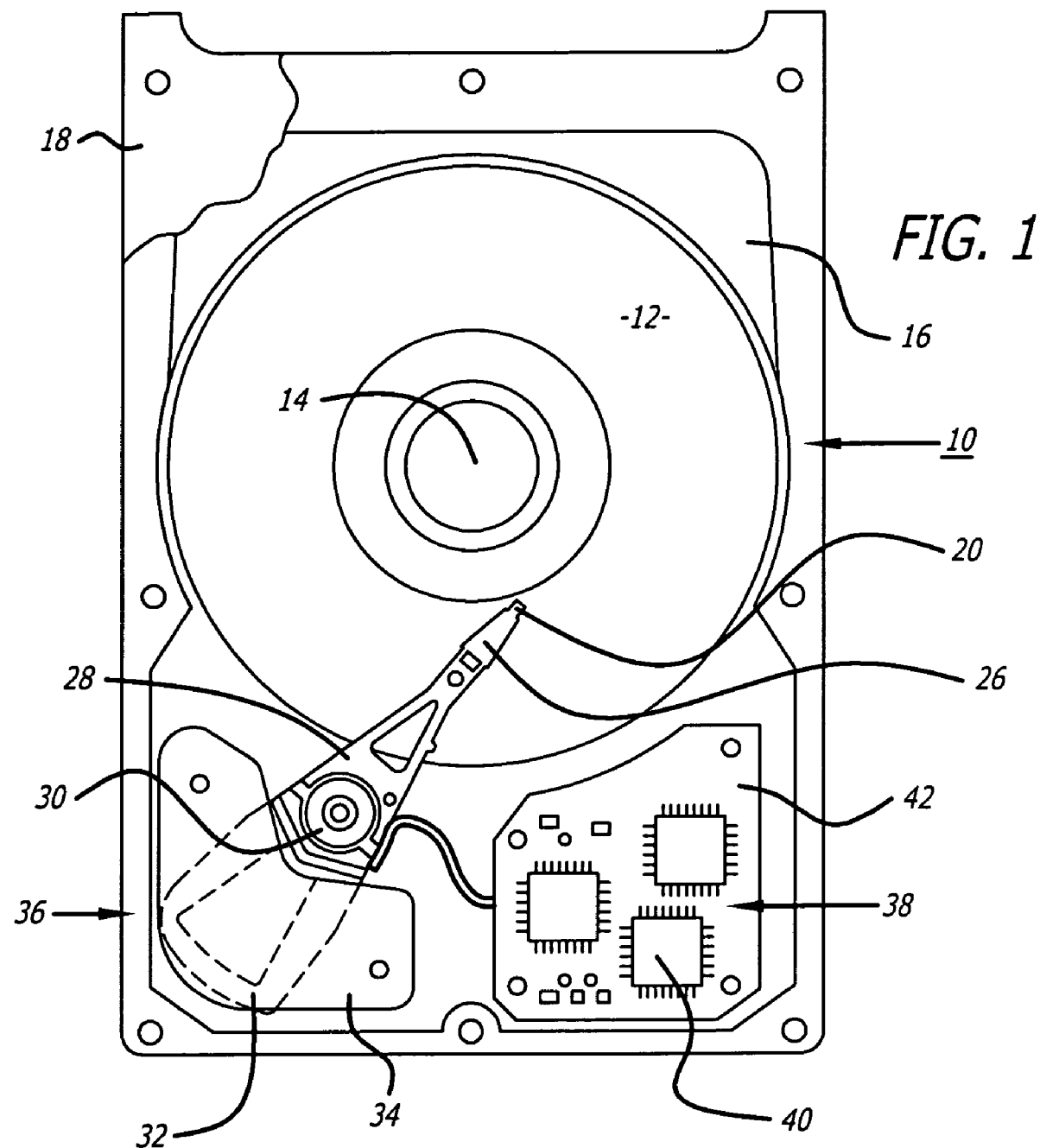
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 2:
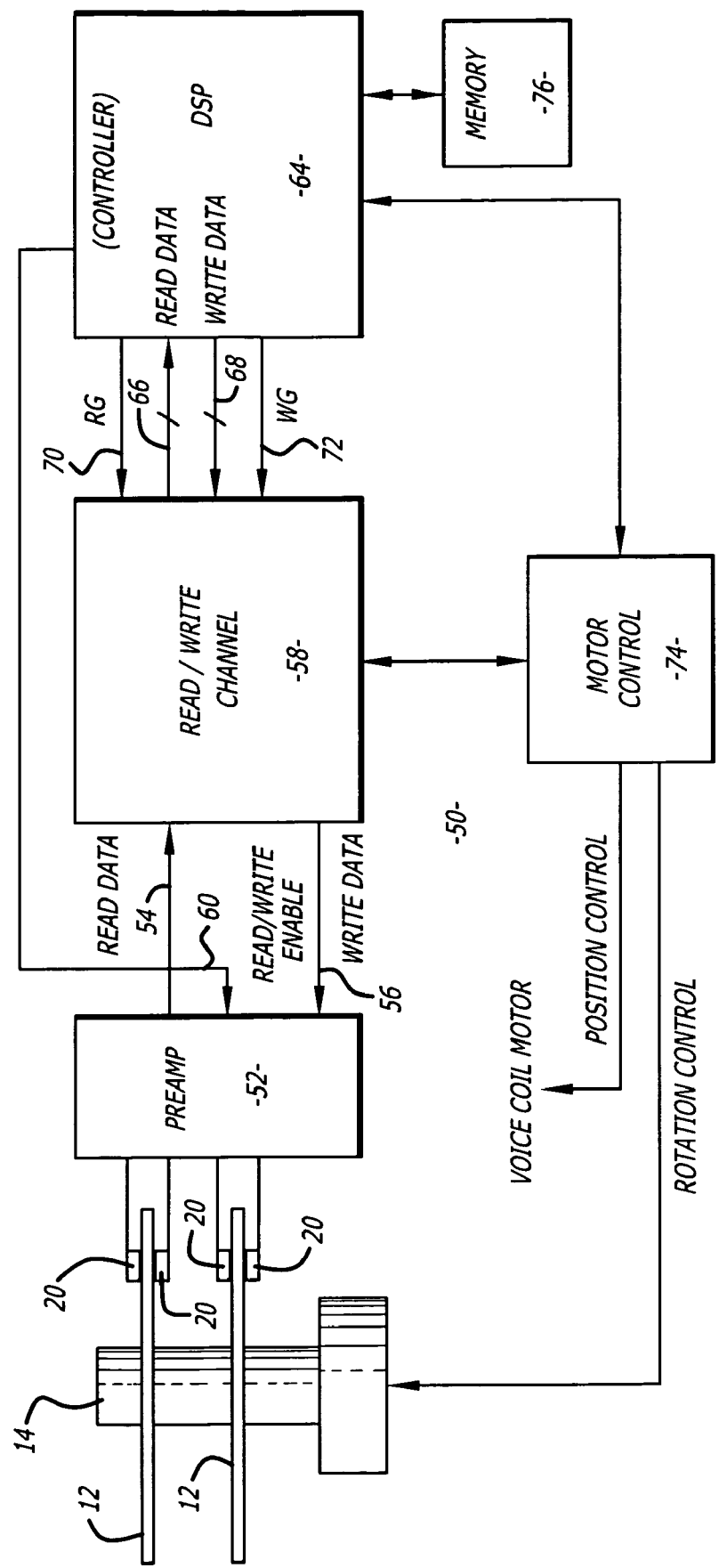
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read-only-memory ("ROM") that contains instructions that are read by the controller 64.

It is desirable to analyze vibration in the disk drive, particularly while the heads are at any location from the ID to the OD of the disk. The vibration can be analyzed by measuring a back emf voltage of the voice coil motor. To maintain the heads at different locations from ID to OD on the disk, different biasing voltages $v_i$ can be applied to the voice coil motor.

Figure 3:
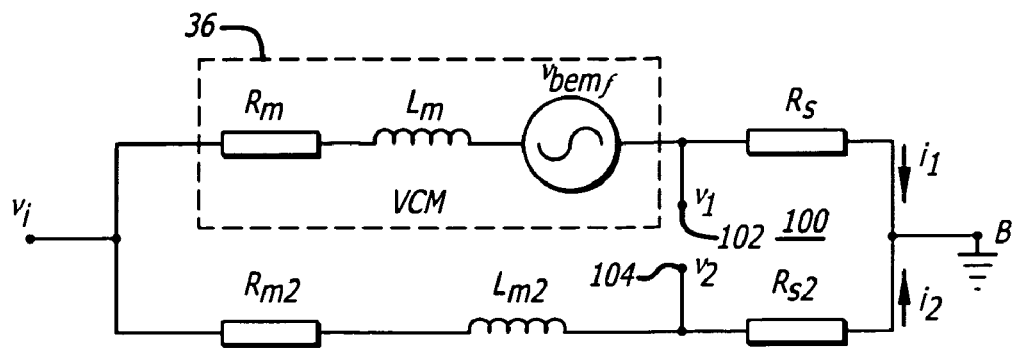
FIG. 3 is a schematic showing a test circuit coupled to a voice coil motor.

FIG. 3 shows a schematic of a test circuit 100 connected to a voice coil motor 36. The voice coil motor 36 can be modeled as having a resistor $R_m$, an inductor $L_m$ and a back emf voltage source $V_{bemf}$. The test circuit 100 has a resistor $R_{m2}$, an inductor $L_{m2}$ and a pair of test resistors $R_s$ and $R_{s2}$. The test circuit 100 may also have test pads 102 and 104 that allow for the measurement of a voltage potential $v_{12}$ which is the difference between $v_1$ and $v_2$. The voltage equation for the test circuit 100 and voice coil motor 36 can be written as:

$$v_i = R_m i_1 + L_m \frac{di_1}{dt} + v_{bemf} + R_s i_1 \quad (1)$$
$$= R_{m2} i_2 + L_{m2} \frac{di_2}{dt} + R_{s2} i_2$$

Which can be written in terms of $V_{bemf}$ by the equation:

$$v_{bemf} = R_{m2} i_2 - R_m i_1 + L_{m2} \frac{di_2}{dt} - L_m \frac{di_1}{dt} + R_{s2} i_2 - R_s i_1 \quad (2)$$

Knowing that $v_1$ equals $i_1$ times $R_s$ and $v_2$ equals $i_2$ times $R_{s2}$, equation (2) can be written as:

$$v_{bemf} = \frac{R_{m2}}{R_{s2}} v_2 - \frac{R_m}{R_s} v_1 + \frac{L_{m2}}{R_{s2}} \frac{dv_2}{dt} - \frac{L_m}{R_s} \frac{dv_1}{dt} + v_2 - v_1 \quad (3)$$

If the resistor and inductor values are selected so that:

$$\frac{R_{m2}}{R_{s2}} = \frac{R_m}{R_s} \quad (4)$$

$$\frac{L_{m2}}{R_{s2}} = \frac{L_m}{R_s} \quad (5)$$

The equation (3) can be simplified to:

$$v_{bemf} = \left(1 + \frac{R_m}{R_s}\right) v_{21} + \frac{L_m}{R_s} \frac{dv_{21}}{dt} \quad (6)$$

where $v_{21} = v_2 - v_1$ or in S-domain:

$$V_{bemf} = \left(1 + \frac{R_m}{R_s} + \frac{L_m}{R_s} s\right) V_{21} \quad (7)$$

To further simplify, $R_s$ can be selected to be much larger than $L_m$ so that equation (7) becomes:

$$v_{bemf} \approx \left(1 + \frac{R_m}{R_s}\right) v_{21}, \quad \text{if } L_m \ll R_s \quad (8)$$

The back emf voltage $V_{bemf}$ can be determined by measuring $v_{12}$ and multiplying by the $1 + R_m/R_s$ term of equation (8).

The value for $R_s$ should be set so that enough current is applied to the voice coil motor 36. For example, for a voice coil motor 36 with a $R_m$ of 10 ohms and an inductance of 1.0 mH, $R_s$ should be set to 40 ohms to achieve a current of 20 mA with a biasing voltage of 1 V. This DC current level can be adjusted to bias actuator at any location from the ID to the OD of the disk. It has been found that the approximation provided by equation (8) introduces little error for frequencies up to 1000 Hz.

Figure 4:
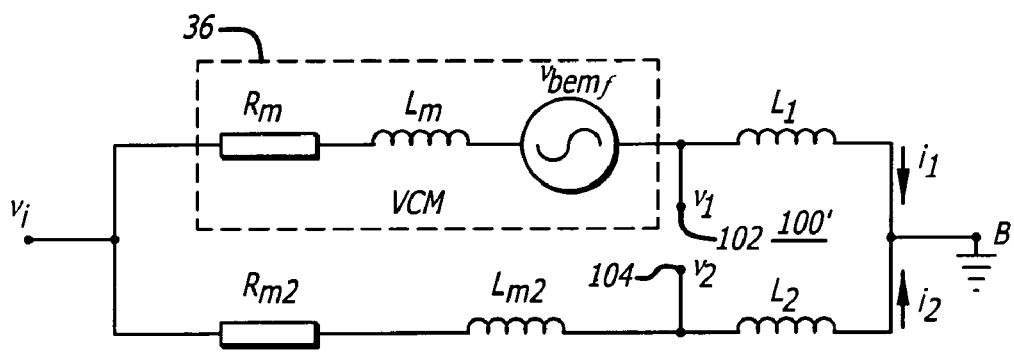
FIG. 4 is a schematic showing another embodiment of the test circuit coupled to the voice coil motor.

FIG. 4 shows an alternate embodiment of a test circuit 100' with a pair of test inductors $L_1$ and $L_2$. This circuit is particularly useful to more accurately determine the back emf voltage at frequencies above 1000 Hz. The voltage equation can be written as:

$$v_{bemf} = \frac{R_{m2}}{L_2} \int v_2 dt - \frac{R_m}{L_1} \int v_1 dt + \frac{L_{m2}}{L_2} v_2 - \frac{L_m}{L_1} v_1 + v_2 - v_1 \quad (9)$$

If the resistors and inductors are selected so that:

$$\frac{R_{m2}}{L_2} = \frac{R_m}{L_1} \quad (10)$$

$$\frac{L_{m2}}{L_2} = \frac{L_m}{L_1} \quad (11)$$

Then equation (9) can be written as:

$$v_{bemf} = \frac{R_m}{L_1} \int v_{21} dt + \left(\frac{L_m}{L_1} + 1\right) v_{21} \quad (12)$$

or in S-domain as:

$$V_{bemf} = \left(\frac{R_m}{L_1 s} + \frac{L_m}{L_1} + 1\right) V_{21} \quad (13)$$

At higher vibration frequencies the $R_m/L_1 s$ term becomes small so that the back emf voltage $V_{bemf}$ is linearly proportional to the measured voltage $v_{12}$.

Figure 5:
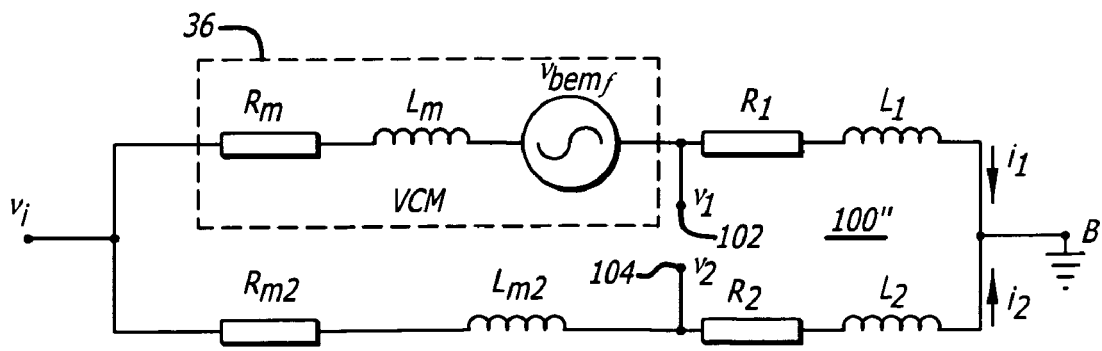
FIG. 5 is a schematic showing another embodiment of the test circuit coupled to the voice coil motor.

FIG. 5 shows another embodiment of a test circuit 100" with both test resistors and test inductors. The test circuit 100" can be constructed by connecting 3 disabled voice coil motors with the voice coil motor 36. The voltage equation can be written as:

$$V_{bemf}=(L_{m2}s+R_{m2})I_2-(L_m s+R_m)I_1+V_{21} \quad (14)$$

which can be rewritten as:

$$V_{bemf} = \frac{L_{m2}s + R_{m2}}{L_2 s + R_2}V_2 - \frac{L_m s + R_m}{L_1 s + R_1}V_1 + V_{21} \quad (15)$$

Selecting the resistor and inductor values so that:

$$\frac{L_{m2}}{L_2} = \frac{L_m}{L_1} \quad (16)$$

$$\frac{R_{m2}}{L_{m2}} = \frac{R_m}{L_m} \quad (17)$$

$$\frac{R_2}{L_2} = \frac{R_1}{L_1} \quad (18)$$

Equation (15) can be simplified to:

$$V_{bemf} = \left(1 + \frac{L_m s + R_m}{L_1 s + R_1}\right)V_{21} \quad (19)$$

If:

$$\frac{R_m}{L_m} = \frac{R_1}{L_1} \quad (20)$$

Then equation (19) can be further simplified to:

$$V_{bemf} = \left(1 + \frac{L_m}{L_1}\right)V_{21} \quad (21)$$

Another way to simplify is to set:

$$L_{m2}=L_2=L_1=L_m \quad (22)$$

$$R_{m2}=R_2=R_1=R_m \quad (23)$$

So that the back emf voltage can be expressed as:

$$V_{bemf}=2V_{21} \quad (24)$$

The test circuits allow for the measurement of the VCM back emf voltage even when a relatively large biasing voltage $V_i$ is applied to maintain the heads at any location on the disk from ID to OD. The back emf voltage can be analyzed to study vibration in the disk drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   an actuator arm coupled to said head;
   a voice coil motor that is coupled to said actuator arm and receives a biasing voltage, said voice coil motor having a back emf voltage; and,
   a test circuit that consists of passive elements and is used to determine said back emf voltage during application of said biasing voltage.

2. The hard disk drive of claim 1, wherein said test circuit includes a pair of test resistors.

3. The hard disk drive of claim 2, wherein said back emf voltage is linearly related to a ratio of said test resistors.

4. The hard disk drive of claim 1, wherein said test circuit includes a pair of test inductors.

5. The hard disk drive of claim 2, wherein said test circuit includes a pair of test inductors.

6. The hard disk drive of claim 4, wherein said back emf voltage is linearly related to a ratio of said test inductors.

7. A hard disk drive, comprising:
   a disk;
   a head coupled to said disk;
   an actuator arm coupled to said head;
   a voice coil motor that is coupled to said actuator arm and receives a biasing voltage, said voice coil motor having a back emf voltage; and,
   passive test circuit means for determining said back emf voltage during an application of said biasing voltage.

8. A method for determining a back emf voltage of a voice coil motor of a hard disk drive, comprising:
   coupling a test circuit that consists of passive elements to a voice coil motor;
   applying a biasing voltage to the voice coil motor; and,
   determining a back emf voltage of the voice coil motor from the test circuit during application of the biasing voltage.

9. The method of claim 8, wherein the back emf voltage is determined from a ratio of test resistors of the test circuit.

10. The method of claim 8, wherein the back emf voltage is determined from a ratio of test inductors of the test circuit.

11. The method of claim 8, further comprising analyzing a vibration from the back emf voltage.

* * * * *